United States Patent
Kojima et al.

(10) Patent No.: US 7,044,890 B2
(45) Date of Patent: May 16, 2006

(54) CONTROL APPARATUS AND METHOD FOR AUTOMATIC TRANSMISSION

(75) Inventors: Sei Kojima, Nukata-gun (JP); Ryoji Habuchi, Okazaki (JP); Hiroji Taniguchi, Okazaki (JP); Shinya Toyoda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 47 days.

(21) Appl. No.: 10/721,465

(22) Filed: Nov. 26, 2003

(65) Prior Publication Data

US 2004/0110601 A1    Jun. 10, 2004

(30) Foreign Application Priority Data

Dec. 10, 2002    (JP) ............................. 2002-358327

(51) Int. Cl.
*B60K 41/02* (2006.01)
*B60K 41/20* (2006.01)
*B60K 41/26* (2006.01)

(52) U.S. Cl. ..................... 477/175; 477/94; 477/901; 192/220.1

(58) Field of Classification Search ............ 477/174–5, 477/86, 94, 180, 901; 192/220.1
See application file for complete search history.

(56) References Cited

U.S. PATENT DOCUMENTS

| 4,730,708 | A | * | 3/1988 | Hamano et al. | ............. 477/114 |
| 5,803,869 | A | * | 9/1998 | Jamzadeh et al. | ........... 477/175 |
| 5,906,559 | A | * | 5/1999 | Murasugi et al. | ............. 477/93 |
| 6,346,064 | B1 | * | 2/2002 | Hada et al. | ................. 477/901 |
| 6,454,677 | B1 | * | 9/2002 | Saito et al. | .................... 477/93 |
| 6,494,808 | B1 | * | 12/2002 | Lee | .............................. 477/94 |
| 2001/0049575 | A1 | | 12/2001 | Muratomi | |

FOREIGN PATENT DOCUMENTS

| JP | 2000-310318 | 11/2000 |
| JP | 2001-165299 | 6/2001 |
| JP | 2001-315551 | 11/2001 |
| JP | 2001-34944 | 12/2001 |
| JP | 2001-349424 | 12/2001 |

* cited by examiner

*Primary Examiner*—Roger Pang
(74) *Attorney, Agent, or Firm*—Oblon, Spivak, McClelland, Maier &Neustadt, P.C.

(57) ABSTRACT

A control apparatus for an automatic transmission, which executes a neutral control by which an input clutch that transmits driving force from a driving source to the automatic transmission is released when conditions, being i) a shift lever is in a position corresponding to a forward speed range, ii) an accelerator operation is not being performed, iii) a brake operation is being performed, and iv) a vehicle speed is equal to, or less than, a predetermined vehicle speed, are fulfilled, is provided a controller which detects a road gradient and outputs a command to release the input clutch when i) the detected road gradient is equal to, or less than, a predetermined value, and ii) the conditions are fulfilled. After the command has been output, the controller compares the detected road gradient and the predetermined value and cancels the output of the command if the road gradient is greater than the predetermined value. Accordingly, fuel efficiency is able to be further improved during the neutral control.

10 Claims, 7 Drawing Sheets

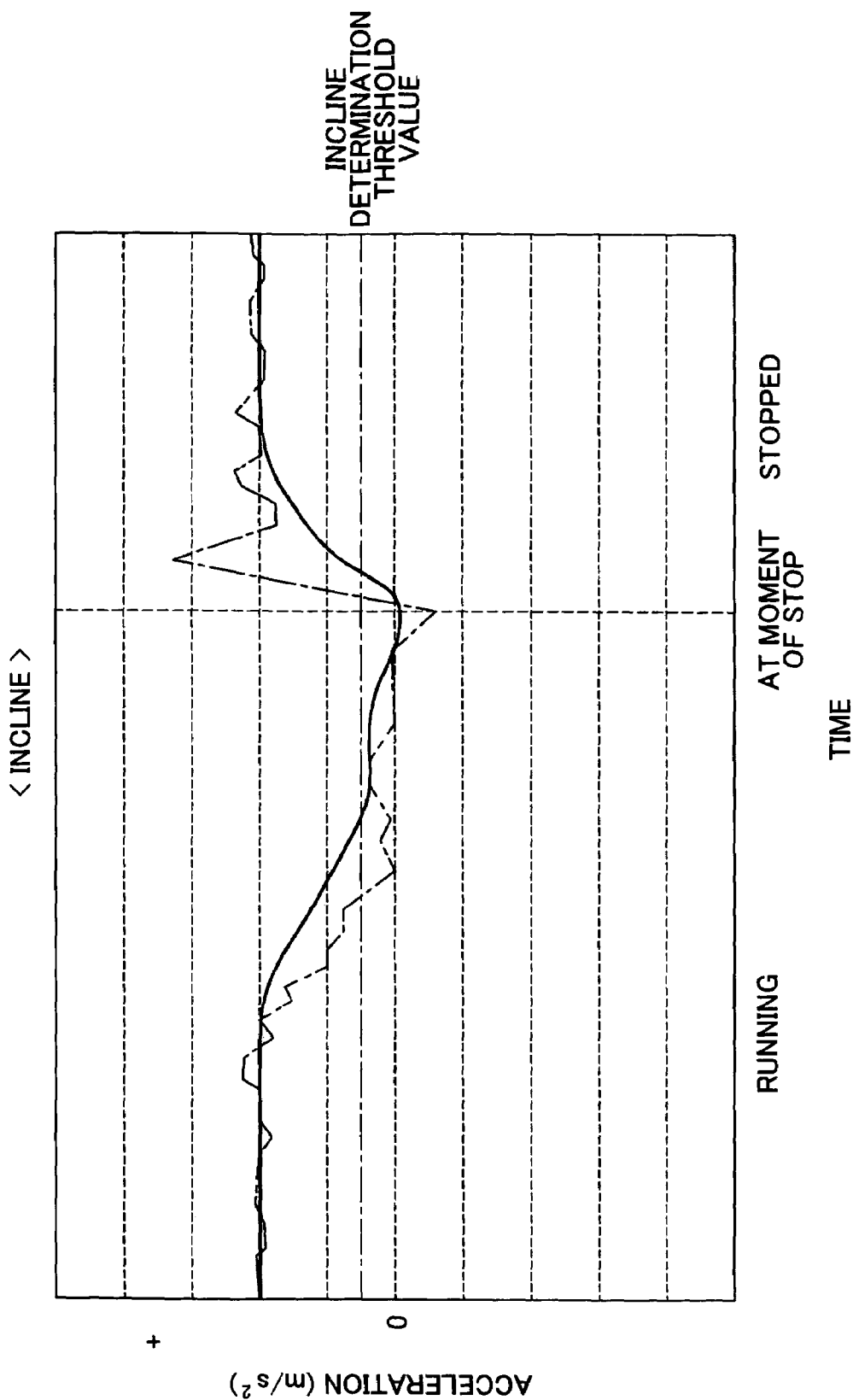

CONTROL APPARATUS AND METHOD FOR AUTOMATIC TRANSMISSION

INCORPORATION BY REFERENCE

The disclosure of Japanese Patent Application No. 2002-358327 filed on Dec. 10, 2002, including the specification, drawings and abstract is incorporated herein by reference in its entirety.

BACKGROUND OF THE INVENTION

1. Field of the Invention

The invention relates to a control of an automatic transmission for a vehicle, and more particularly, to a control apparatus and method for an automatic transmission which executes a neutral control.

2. Description of the Related Art

An automatic transmission to be mounted in a vehicle includes a shifting mechanism which is connected to an engine via a torque converter and the like, and which has a plurality of power transmission paths. This automatic transmission automatically switches gear ratios (i.e., speeds) based on, for example, a throttle opening and vehicle speed. A vehicle having an automatic transmission is typically provided with a shift lever which is operated by a driver into any one of various shift positions (e.g., REVERSE, NEUTRAL, DRIVE). In automatic shift mode there is a "forward drive range" in which the automatic transmission is automatically switched to a predetermined gear ratio/speed.

When a vehicle having this type of automatic transmission is stopped with the shift lever in a position corresponding to a forward speed range, such as DRIVE, driving force from the idling engine is transmitted to the transmission via the torque converter and this force is then transmitted to the wheels, resulting in a phenomenon known as "creeping." Creeping is extremely useful under certain conditions. For example, it helps to keep the vehicle from slipping backwards and enables a vehicle stopped on an incline to start smoothly. When the driver wants a vehicle that is stationary on a flat road to remain in one spot, however, creeping is unnecessary and must be suppressed by operating the brake. That is, the brake is used to suppress the creeping force from the engine and the fuel efficiency of the engine decreases a corresponding amount.

To improve fuel efficiency, therefore, it has been proposed to put a transmission that is in DRIVE or another forward speed range into a neutral state including a semi-neutral state that resembles neutral when the vehicle is being held stationary by the brake pedal being depressed so as to operate the brake and the accelerator being almost completely closed.

JP(A) 2001-349424 discloses a control apparatus which prohibits a transmission from moving into a neutral state while on an incline.

This control apparatus controls an automatic transmission with automatic neutral control, by which the transmission is put into a neutral state, when the automatic transmission is in DRIVE or another forward speed range and the vehicle has been stationary in the idling state for a predetermined sustained period of time. This control apparatus includes an automatic neutral state alert circuit which alerts the driver that the automatic transmission is in the neutral state, an incline detection circuit which detects when the vehicle is on an incline, and an automatic neutral control prohibiting circuit which prohibits automatic neutral control when it has been detected that the vehicle is on an incline.

With this control apparatus, the automatic neutral state alert circuit alerts the driver that automatic neutral control is being performed on the automatic transmission so the driver does not feel a sense of discomfort. Further, by prohibiting the automatic neutral control when the vehicle is on an incline, backward slipping of the vehicle is able to be suppressed.

The control apparatus disclosed in the above-mentioned publication, however, uses an incline sensor to sense whether the vehicle is on an incline. When this type of sensor is mounted in a vehicle, it is affected by vibrations from the engine and drive-line when the vehicle is stationary as well as when the vehicle is running. Because of this, the raw data picked up by the sensor can not be used as it is. Therefore, the raw data picked up by the sensor is typically processed and the angle of inclination is detected according to the processed data. This data processing will hereinafter be described in a case in which a G sensor (i.e., an acceleration sensor), for example, is used as the incline sensor.

FIGS. 6 and 7 are graphs showing raw data (indicated by broken lines) picked up by the G sensor, and the processed data (indicated by solid lines). FIG. 6 shows a case in which the vehicle is on a flat road and FIG. 7 shows a case in which the vehicle is on an incline. The horizontal axes in both drawings represent time and the vertical axes represent acceleration. In the graphs, the vehicle comes to a stop with the passage of time. The output values of the raw data (i.e., the broken lines) shown in both FIGS. 6 and 7 are not exactly accurate as they are affected by vibrations and the like while the vehicle is driving, while the vehicle is coming to a stop, and while the vehicle is stopped. In particular, the vehicle vibrates a great deal just before and just after stopping, and a small value indicative of a flat road is output just after the vehicle is stopped on an incline.

Therefore, the raw data is typically put through a smoothing process, and the processed data (the solid lines) is used as a condition for starting the neutral control. In this smoothing process, at each sampling time, the effects from the raw data picked up by the G sensor on the processed data for the last sampling time are taken into consideration (Only about 30 to 80%, instead of 100%, of the raw data is taken into consideration at this time), and new processed data is created.

As a result, even when there is vibration in the raw data, the effects are reduced, enabling the error to be kept small. According to this smoothing process, values of the processed data that correspond to the true gradient of the road are output approximately one second after the vehicle has come to a stop. This is evident from the fact that the processed data (the solid lines) is temporally behind the raw data (the broken lines) in FIGS. 6 and 7.

In JP(A) 2001-349424, this kind of smoothing process is not mentioned, but when a G sensor, which is actually the most common incline sensor, is used to obtain the inclination of the road on which the vehicle is stopped, or further, when any type of sensor is used to obtain the inclination of the road on which the vehicle is stopped, this type of time delay is unavoidable. That is, in reality, even if the conditions for starting neutral control are fulfilled in a condition other than the condition that the road on which the vehicle is stopped is not an incline, it is not possible to determine whether the vehicle is stopped on an incline for approximately one second due to a delay in the output of the processed data from the G sensor.

Therefore, even when the vehicle is stopped on a flat road, in which case the neutral control can start immediately (i.e., even if the data is in a region below the level of the incline determination threshold value shown in FIG. 6), the neutral control starts after confirming that the processed data output from the G sensor approximately one second after the vehicle has come to a stop is below the level of the incline determination threshold. Accordingly, there is a delay in the start of the neutral control. On the other hand, when the vehicle is stopped on an incline, in which case the neutral control should not be started (i.e., even if the data is in a region above the level of the incline determination threshold value shown in FIG. 7), it is determined that the neutral control can be started because the processed data output from the G sensor immediately after the vehicle was stopped is below the level of the incline determination threshold value. Because the vehicle is stopped on an incline, however, the neutral control should not be started. Therefore, it is necessary to start the neutral control after confirming that the processed data output from the G sensor after approximately one second after the vehicle has stopped is truly below the level of the incline determination threshold value.

In this case, one way to eliminate the delay in the start timing of the neutral control caused by the time delay from the G sensor and substantially increase the time that the transmission is in the neutral state would be to increase the release speed of the input clutch of the automatic transmission, the release of which results in the transmission becoming in the neutral state. Doing so, however, would result in a large shock when the input clutch is released. With neutral control which is not based on an operation by the driver, the shift into the neutral state should be unnoticeable by the driver. Therefore, the input clutch used to achieve the neutral state should be released gradually, not immediately after a command to release it is output. The time it takes for the input clutch to completely release after this input clutch release command is output is controlled by an ECU (Electronic Control Unit).

SUMMARY OF THE INVENTION

In view of the foregoing problems, this invention thus provides a control apparatus for an automatic transmission which executes a neutral control, the control apparatus being able to extend the period of time during which the neutral control is executed in order to improve fuel efficiency.

A first aspect of the invention relates to a control apparatus for an automatic transmission which executes a neutral control by which an input clutch that transmits driving force from a driving source to the automatic transmission is released when conditions, being i) a shift lever is in a position corresponding to a forward speed range, ii) an accelerator operation is not being performed, iii) a brake operation is being performed, and iv) a vehicle speed is equal to, or less than, a predetermined vehicle speed, are fulfilled. The control apparatus includes a controller which detects a road gradient and outputs a command to release the input clutch when i) the detected road gradient is equal to, or less than, a predetermined value, and ii) the conditions are fulfilled. After the command is output, the controller compares the detected road gradient and the predetermined value and cancels the output of the command if the road gradient is greater than the predetermined value.

Another aspect of the invention relates to a control method for an automatic transmission which executes a neutral control by which an input clutch that transmits driving force from a driving source to the automatic transmission is released when conditions, being i) a shift lever is in a position corresponding to a forward speed range, ii) an accelerator operation is not being performed, iii) a brake operation is being performed, and iv) a vehicle speed is equal to, or less than, a predetermined vehicle speed, are fulfilled. The control method includes the steps of detecting a road gradient; outputting a command to release the input clutch when i) the detected road gradient is equal to, or less than, a predetermined value, and ii) the conditions are fulfilled; and, after the command is output, comparing the detected road gradient and the predetermined value and canceling the output of the command if the road gradient is greater than the predetermined value.

According to this control apparatus and method for an automatic transmission, the true road gradient is detected after a set period of time after the vehicle is stopped. If the road gradient detected immediately after the vehicle is stopped is equal to, or less than, the predetermined value, the neutral control starts immediately and a command to release the input clutch is output. Even after this command has been output, e.g., after a set period of time has passed after the vehicle was stopped, the command is cancelled if the detected road gradient at that time is larger than the predetermined value to which it is compared. Accordingly, when the detected road gradient is compared to the predetermined value after the set period of time has passed after the vehicle is stopped and that road gradient is less than the predetermined value, the neutral control is continued. On the other hand, if that road gradient is larger than the predetermined value, the neutral control is cancelled. In the case where the neutral control is cancelled, the input clutch used to put the transmission in the neutral state is not yet completely released at the time the neutral control is cancelled. That is, the release of the input clutch is controlled so that the input clutch releases gradually to prevent shock from occurring. Therefore, by making the time it takes for the input clutch to completely release after the release command has been output longer than the set period of time it takes to detect the true road gradient, it is possible to cancel the neutral control before the transmission has shifted into the neutral state even after the neutral control has started (i.e., even after the command to release the input clutch has been output) when the vehicle is actually stopped on an incline, and start the neutral control without the set delay time when the vehicle is actually stopped on a flat road. As a result, a control apparatus for an automatic transmission which executes a neutral control can be provided which is able to extend the period of time during which the neutral control is executed in order to improve fuel efficiency.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which:

FIG. 7 is a graph (part 2) illustrating the smoothing process of the G sensor.

DETAILED DESCRIPTION OF THE PREFERRED EMBODIMENTS

Figure 1:
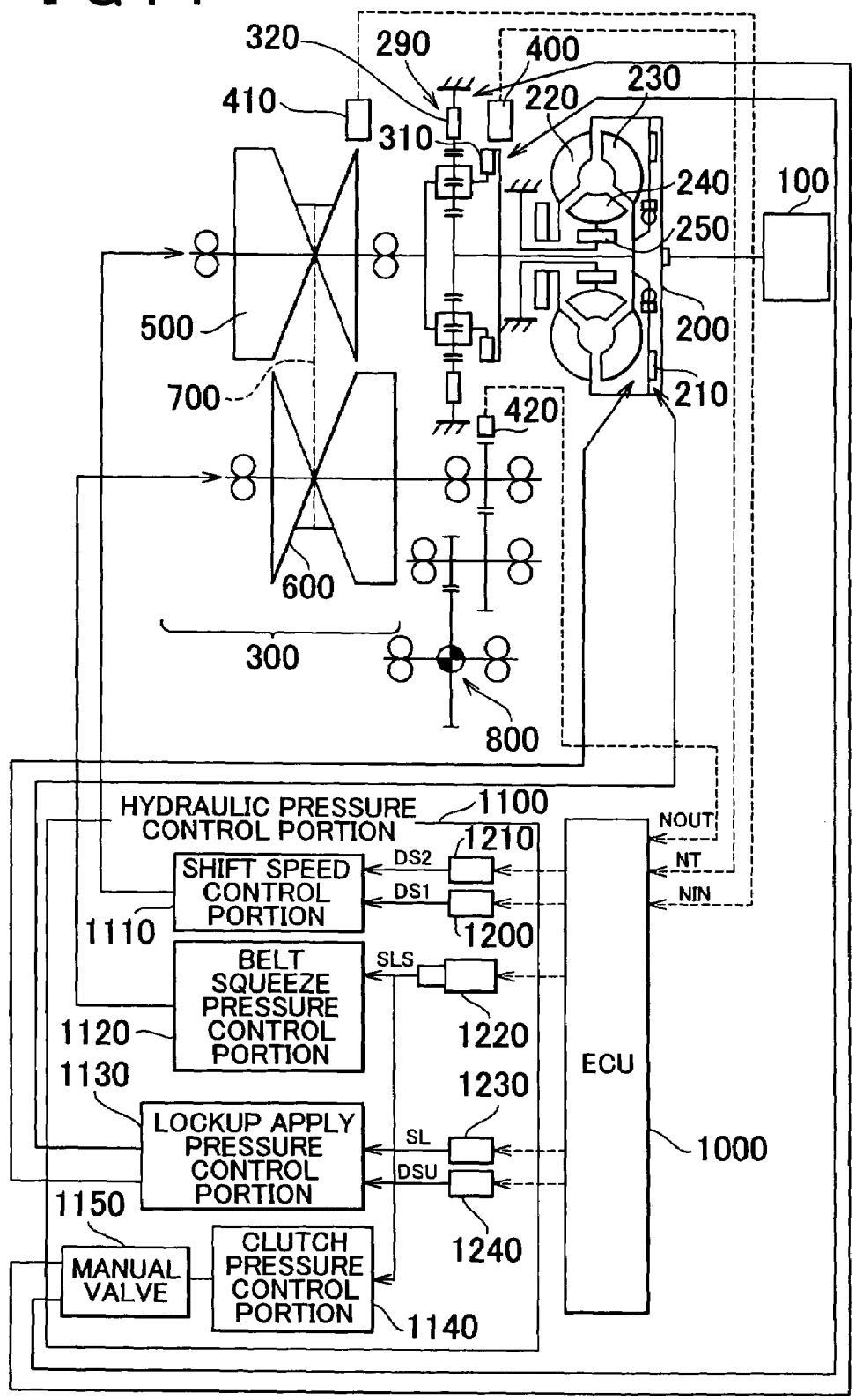
FIG. 1 is a control block diagram of an automatic transmission according to one exemplary embodiment of the invention.

In the following description and the accompanying drawings, the present invention will be described in more detail in terms of exemplary embodiments. In the following description, like components will be designated by like reference characters and repetitive descriptions thereof shall be omitted.

A power train of a vehicle including a control apparatus according to the exemplary embodiment will now be described referring to FIG. 1. The control apparatus according to the exemplary embodiment is realized by an ECU 1000 shown in the drawing. Although the automatic transmission described hereinafter is a belt type continuously variable transmission, the invention is in no way limited thereto.

Referring to FIG. 1, the power train of the vehicle includes an engine 100, a torque converter 200, a forward-reverse switching apparatus 290, a belt type continuously variable transmission (CVT) 300, a differential gear 800, the ECU 1000, and a hydraulic pressure control portion 1100.

An output shaft of the engine 100 is connected to an input shaft of the 200. The engine 100 and the torque converter 200 are connected by a rotating shaft. Accordingly, a rotational speed NE of the output shaft of the engine 100 (i.e., engine speed NE) detected by an engine speed sensor and a rotational speed (pump rotational speed) of the input shaft of the torque converter 200 are the same.

The torque converter 200 has a lockup clutch 210 which directly connects the input shaft and the output shaft, an input shaft side pump impeller 220, an output shaft side turbine impeller 230, and a stator 240 which has a one-way clutch 250 and which acts to increase torque. The torque converter 200 and the CVT 300 are connected by a rotating shaft. A rotational speed NT of the output shaft of the torque converter 200 (i.e., turbine rotational speed NT) is detected by a turbine rotational speed sensor 400.

The CVT 300 is connected to the torque converter 200 via the forward-reverse switching apparatus 290. The CVT 300 includes an input side primary pulley 500, an output side secondary pulley 600, and a metal belt 700 that winds around the primary pulley 500 and the secondary pulley 600. The primary pulley 500 is constructed of a fixed sheave secured to a primary shaft and a movable sheave supported so as to be able to only slide on the primary shaft. The secondary pulley 600 is constructed of a fixed sheave secured to a secondary shaft and a movable sheave supported so as to be able to only slide on the secondary shaft. A rotational speed NIN of the primary pulley in the CVT 300 is detected by a primary pulley rotational speed sensor 410 and a rotational speed NOUT of the secondary pulley in the CVT 300 is detected by a secondary pulley rotational speed sensor 420.

These rotational speed sensors are mounted opposite teeth of gears used to detect rotational speed on the rotating shafts of the primary pulley and the secondary pulley, or on a drive shaft connected to those rotating shafts. These rotational speed sensors are capable of detecting even slight rotation of the primary pulley on the input shaft, and the secondary pulley on the output shaft. These sensors may be sensors which use, for example, magnetic resistance elements, which are generally referred to as semiconductor sensors.

The forward-reverse switching apparatus 290 includes a double pinion planetary gearset, a reverse brake (B1) 320, and an input clutch (C1) 310. In the planetary gearset, a sun gear S is connected to the input shat, a carrier CR which supports first and second pinions P1 and P2 is connected to the primary side fixed sheave, and a ring gear R is connected to the reverse brake (B1) 320 which serves as the reverse friction element. The input clutch (C1) 310 is disposed between the carrier CR and the sun gear S. The input clutch 310, which is also referred to as a forward clutch, is always applied whenever the vehicle is being driven forward, but is released when the vehicle is in park (P), reverse (R), or neutral (N).

Neutral control is control which puts the transmission in a state that resembles neutral, in which the input clutch 310 is released so as to be in a predetermined slip state (in this specification, the input clutch 310 in this state is also referred to as being "completely released") when the vehicle is stopped with the shift lever is in the drive (D) position and predetermined conditions with respect to the vehicle state are fulfilled.

As shown in FIG. 1, various signals are input to the ECU 1000 of an ECT (Electronic Controlled Automatic Transmission). These signals include a signal indicative of the turbine rotational speed NT from the turbine rotational speed sensor 400, a signal indicative of the primary pulley rotational speed NIN from the primary pulley rotational speed sensor 410, and a signal indicative of the secondary pulley rotational speed NOUT from the secondary pulley rotational speed sensor 420.

Referring to the drawing, the hydraulic pressure control portion 1100 includes a shift speed control portion 1110, a belt squeeze pressure control portion 1120, a lockup apply pressure control portion 1130, a clutch pressure control portion 1140, and a manual valve 1150. Control signals are output from the ECU 1000 to a shift control duty solenoid (1) 1200, a shift control duty solenoid (2) 1210, a linear solenoid 1220, a lockup solenoid 1230, and a lockup apply pressure control duty solenoid 1240, all of which are part of the hydraulic control portion 1100.

Figure 2:
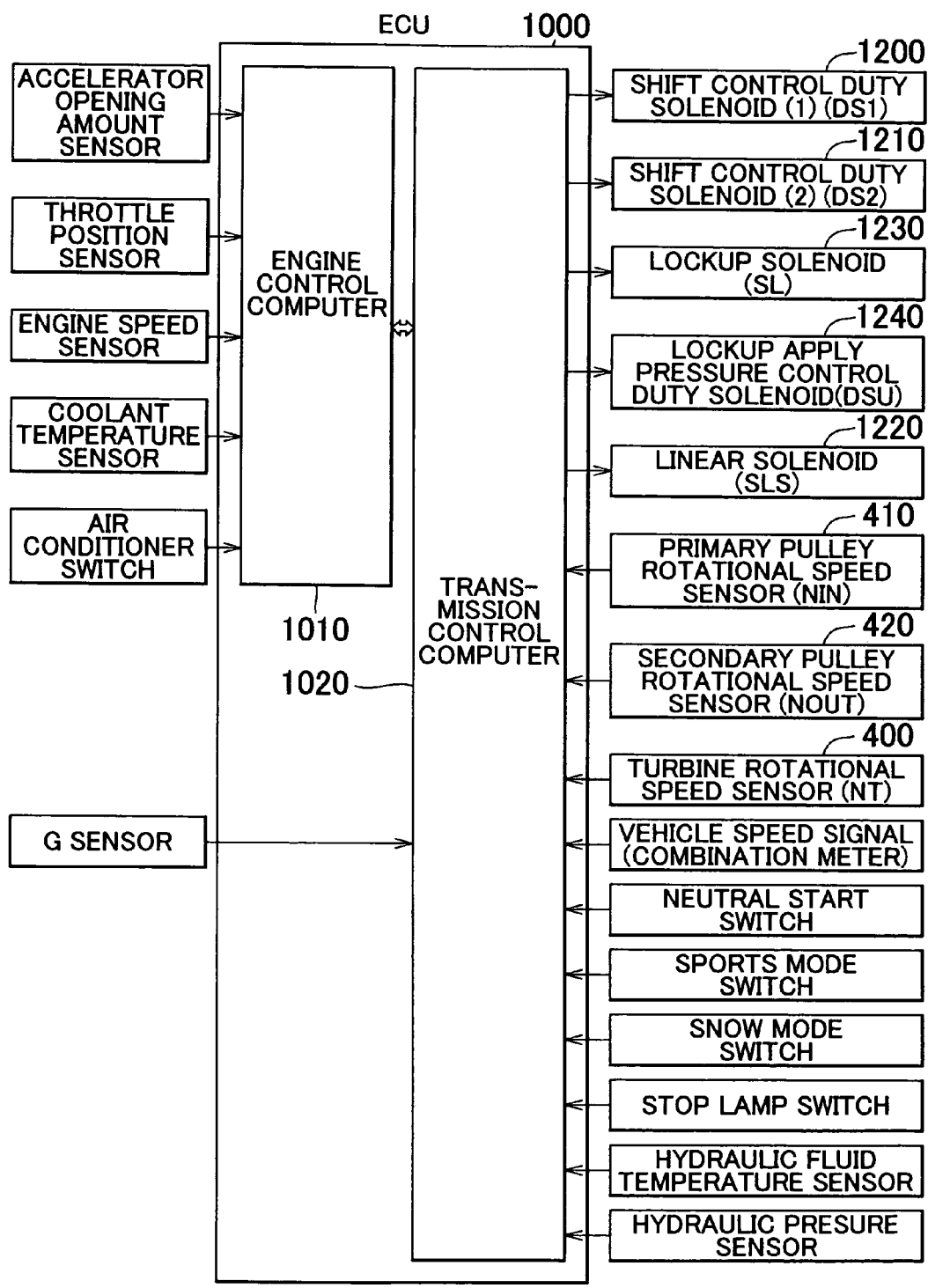
FIG. 2 is a detailed diagram of an ECU shown in FIG. 1.

The construction of the ECU 1000 used to control the power train will now be described in further detail with reference to FIG. 2. As shown in the drawing, the ECU 1000 includes an engine control computer 1010 which controls the engine 100, and a transmission control computer 1020 which controls the torque converter 200, the forward-reverse switching apparatus 290, and the CVT 300.

In addition to the input signals shown in FIG. 1, various other signals are also input to the transmission control computer 1020. These signals include a signal from a stop lamp switch indicative of whether the brake pedal is being depressed by the driver, and a signal from the G sensor indicative of the angle of the incline when the vehicle is stopped on an incline or the like. The smoothing process described earlier may be executed by the transmission control computer 1020 or the G sensor. In the following description, the smoothing process will be executed by the G sensor. Therefore, the value input to the transmission control computer 1020 from the G sensor is one which has been through the smoothing process.

Various signal are also input to the engine control computer 1010. These signals include a signal from an accelerator opening amount sensor indicative of an opening amount of an accelerator pedal depressed by the driver, a signal from a throttle position sensor indicative of an opening amount of an electromagnetic throttle, and a signal from an engine speed sensor indicative of the speed (NE) of the engine 100. The engine control computer 1010 and the transmission control computer 1020 are interconnected.

In the hydraulic pressure control portion 1100, the belt squeeze pressure control portion 1120 controls the squeeze pressure on the belt 700 of the CVT 300 and the clutch pressure control portion 1140 controls the apply pressure of the input clutch 310, based on the control signals output from the transmission control computer 1020 to the linear solenoid 1220.

Figure 3:
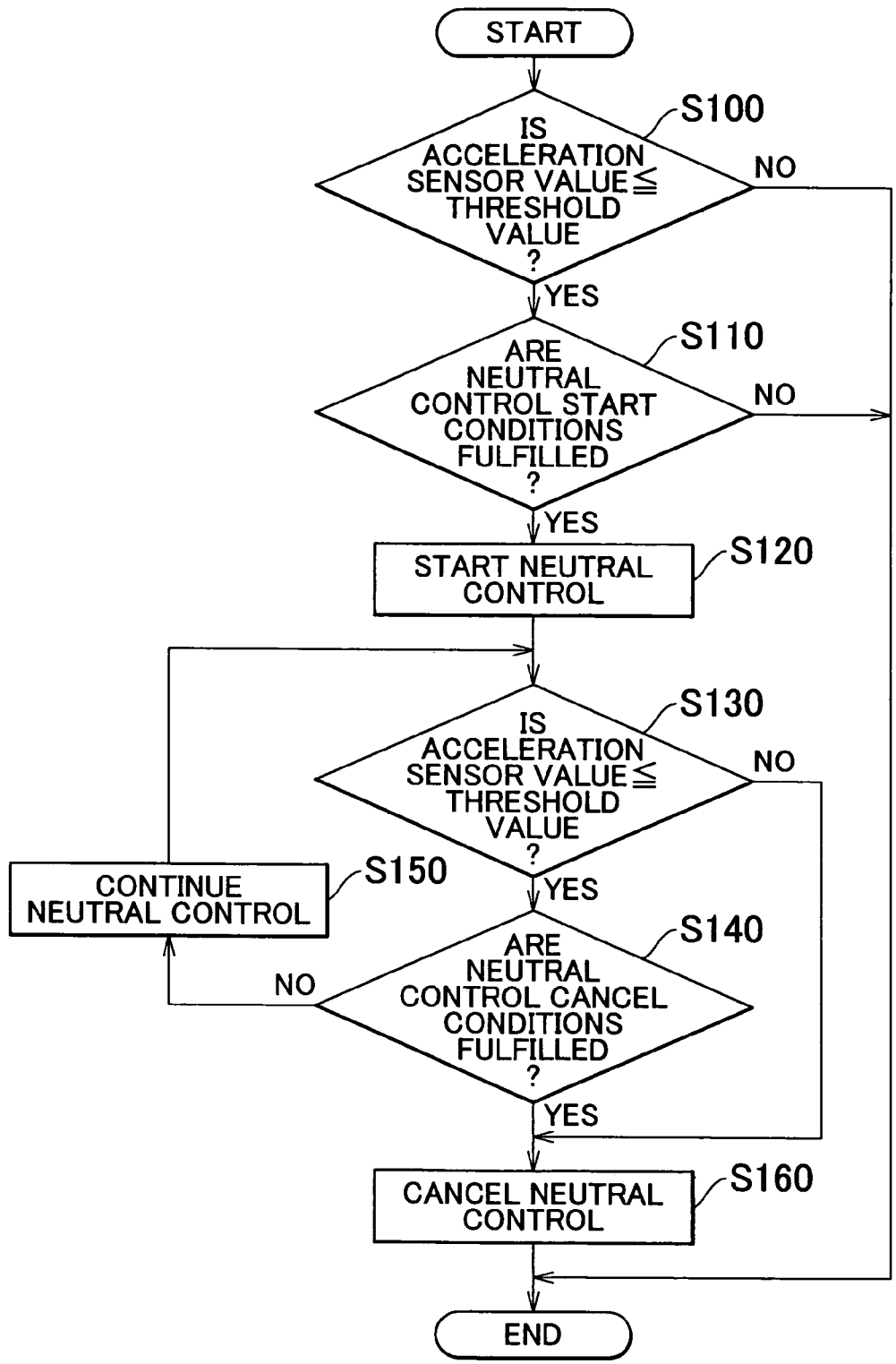
FIG. 3 is a flowchart illustrating the control structure of a program for a neutral control routine executed by the ECU shown in FIG. 1.

The control structure of a program for the neutral control routine executed by the transmission control computer 1020 which serves as the control apparatus according to the exemplary embodiment of the invention will hereinafter be described with reference to FIG. 3.

In step S100, the transmission control computer 1020 determines whether the G sensor value (i.e., data after the smoothing process; also referred to as "processed data") input from the G sensor is equal to, or less than, a predetermined threshold value. This predetermined threshold value is a threshold value indicating that the vehicle is not on an incline, and below which the neutral control is executed. If the G sensor value is equal to, or less than, the threshold value (i.e., YES in step S100), the routine proceeds on to step S110. If the G sensor value is not equal to, or less than, the threshold value (i.e., NO in step S100), then the routine ends.

In step S110, the transmission control computer 1020 determines whether conditions for starting the neutral control are fulfilled. These conditions are fulfilled, for example, when the driver is not depressing the accelerator pedal, when the driver is depressing the brake pedal, when the shift lever is in the forward drive (D) position, and when the vehicle is stopped. More specifically, the determination is made based on the value of the accelerator opening amount sensor input to the transmission control computer 1020 via the engine control computer 1010, and the signal input to the transmission control computer 1020 from the stop lamp switch and the like. If the conditions for starting the neutral control are fulfilled (i.e., YES in step S110), the routine proceeds on to step S120. If not (i.e., NO in step S110), the routine ends.

In step S120, the transmission control computer 1020 starts the neutral control. At this time, the transmission control computer 1020 outputs a command value to the linear solenoid 1220 so that the clutch pressure control portion 1140 releases the input clutch 310.

In step S130, the transmission control computer 1020 determines whether the G sensor value input from the G sensor is equal to, or less than, the threshold value. This step is the same as step S100. If the G sensor value is equal to, or less than, the predetermined threshold value (i.e., YES in step S130), the routine proceeds on to step S140. If not (i.e., NO in step S130), the routine proceeds to step S160.

In step S140, the transmission control computer 1020 determines whether conditions for canceling neutral control are fulfilled. These conditions are fulfilled, for example, when the driver is depressing the accelerator pedal, when the driver has released the brake pedal, and when the driver has changed the shift position of the shift lever. If the conditions for canceling the neutral control have been fulfilled (i.e., YES in step S140), the routine proceeds on to step S160. If not (i.e., NO in step S140), the routine proceeds to step S150.

In step S150, the transmission control computer 1020 continues the neutral control and then determines whether the G sensor value input from the G sensor is equal to, or less than, the predetermined threshold value at each predetermined sampling time.

In step S160, the transmission control computer 1020 executes a process to cancel the neutral control. At this time, the transmission control computer 1020 outputs a command signal to the linear solenoid 1220 so that the clutch pressure control portion 1140 applies the input clutch 310.

The operation of the vehicle in which is mounted the power train controlled by the control apparatus according to this exemplary embodiment of the invention will now be described based on the structure and flowchart described above.

Figure 4:
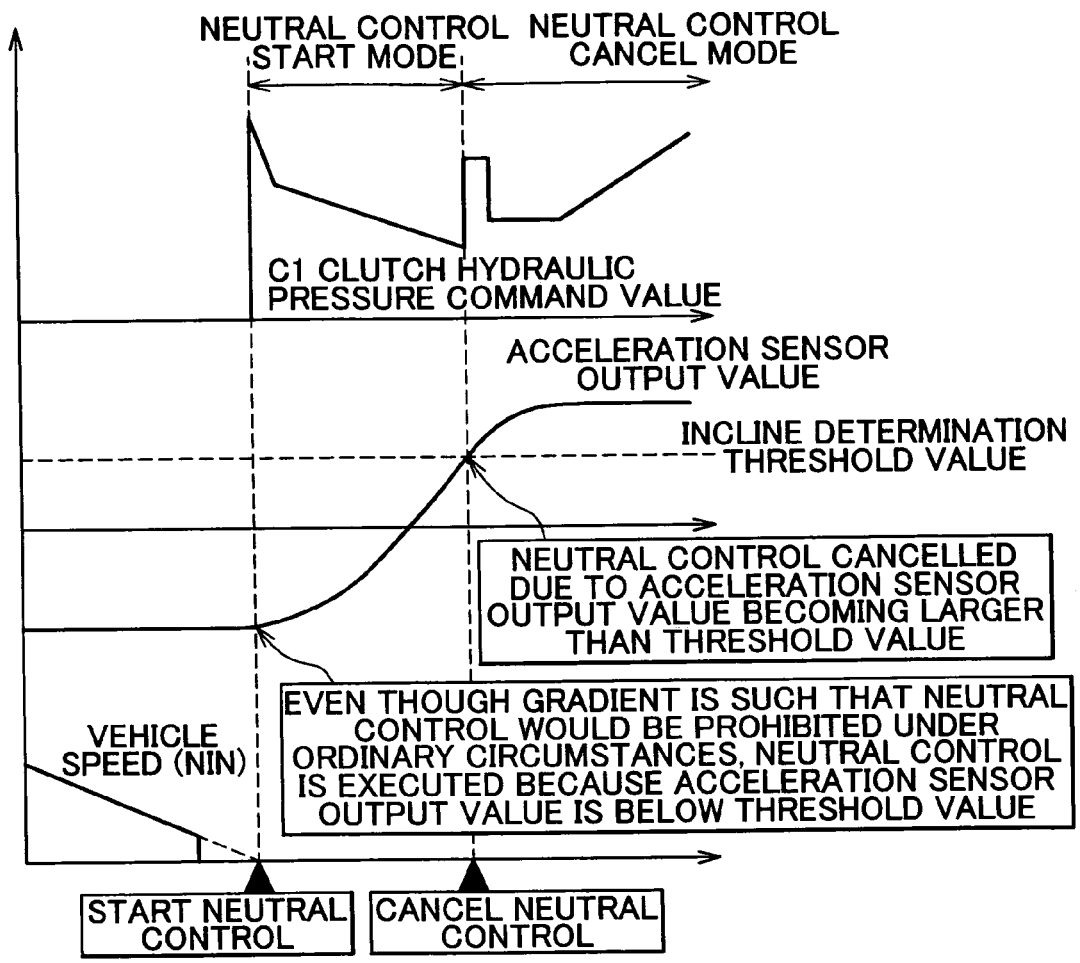
FIG. 4 is a timing chart (part 1) showing the operation of a vehicle in which is mounted the automatic transmission according to the exemplary embodiment of this invention.

Referring to FIG. 4, when the vehicle speed slows, the transmission control computer 1020 detects that the vehicle will stop based on a value input from the primary pulley rotational speed sensor 410. If the G sensor value input from the G sensor is equal to, or less than, the predetermined threshold value (i.e., YES in step S100) at this time, the transmission control computer 1020 determines whether the conditions for starting the neutral control are fulfilled (i.e., step S110). If the G sensor value is not one indicative of an incline, in which case the neutral control would not be executed (i.e., YES in step S100), and the other conditions for starting the neutral control are fulfilled (i.e., YES in step S110), the neutral control is immediately started (step S120). The neutral control is started at this time as shown in FIG. 4. Therefore, even though the gradient is one for which the neutral control is prohibited under ordinary circumstances, if the G sensor value input from the G sensor is less than the threshold value, the neutral control is executed.

Even if the neutral control is executed, it is determined at every predetermined sampling time whether the G sensor value input from the G sensor is equal to, or less than, the threshold value. At this time, the input value from the G sensor time gradually rises because of the delay in the output of the true gradient value from the earlier smoothing process. The G sensor value input from the G sensor is then compared at the predetermined sampling time with the predetermined threshold value (step S130), and if the G sensor value is greater than the predetermined threshold value (i.e., NO in step S130), a process to cancel the neutral control is executed (step S160).

Because the G sensor value input from the G sensor is larger than the incline determination threshold value at this time, the process to cancel the neutral control is executed, as shown in FIG. 4. As shown in the same drawing, because the hydraulic pressure command value for the input clutch 310 becomes one for the neutral control start mode at the start of the neutral control, it initially drops at a steep gradient (first sweep) and then gradually decreases thereafter (second sweep).

The timing at which the neutral control is cancelled, shown in FIG. 4, is earlier than the timing at which the input clutch 310 is completely released. Therefore, even if the transmission control computer 1020 increases the hydraulic pressure command value for the input clutch 310 in steps so that the input clutch 310 applies in a stepped manner when the transmission is in a neutral control cancel mode in order to cancel the neutral control, no shock will occur because the input clutch 310 is not yet completely released.

Figure 5:
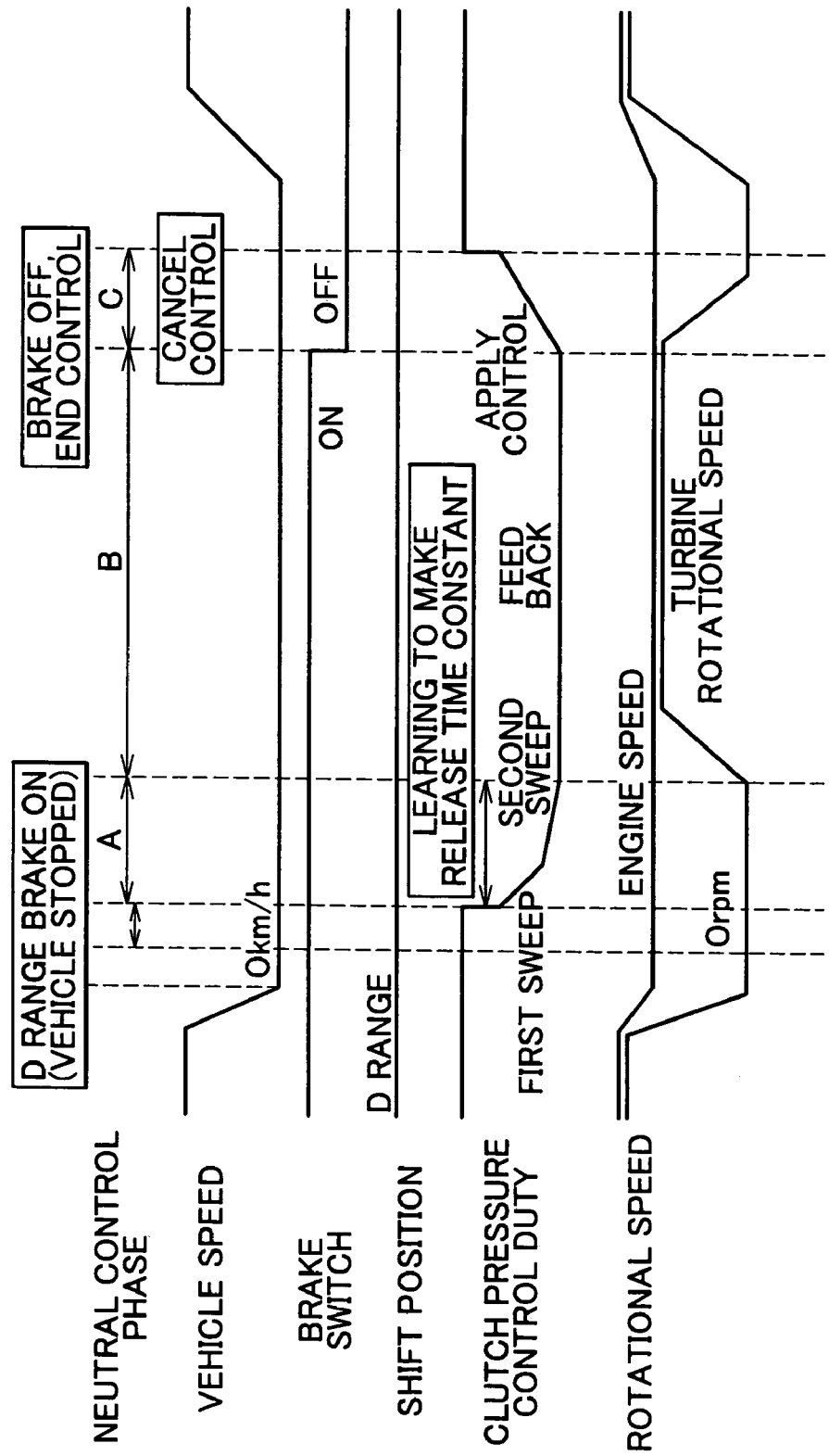
FIG. 5 is a timing chart (part 2) showing the operation of the vehicle in which is mounted the automatic transmission according to the exemplary embodiment of this invention.
Figure 6:
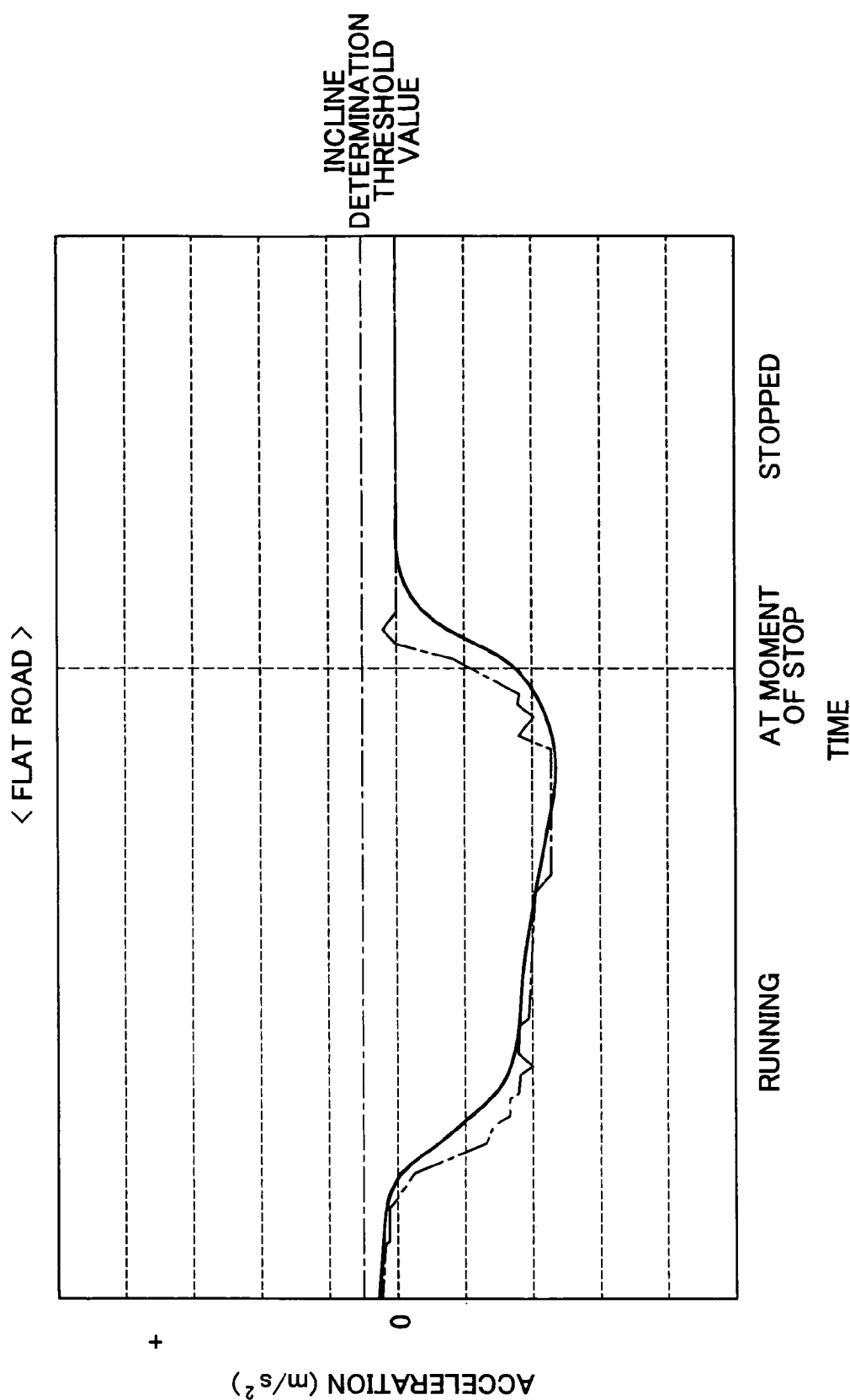
FIG. 6 is a graph (part 1) illustrating a smoothing process of a G sensor.

The timing chart will now be explained in more detail with reference to FIG. 5. In the timing chart shown in FIG. 5, when a neutral control phase (A) starts, the transmission enters a first sweep state where a clutch pressure control duty is reduced more sharply than in a second sweep state which follows the first sweep state. After a predetermined time in the first sweep state, or when the hydraulic pressure command value falls to a predetermined hydraulic pressure value as a result of the first sweep, the transmission enters the second sweep state. When the transmission is in this second sweep state, the clutch pressure control duty is reduced more gradually than it was in first sweep state. When the input clutch 310 actually starts to release, the transmission shifts to a neutral control phase (B) so the turbine rotational speed NT is approximately the same as the engine speed NE.

In the neutral control phase (A) the turbine rotational speed NT rises due to the fact that the input clutch 310 has started to release. The transmission control computer 1020 performs learning control such that the time of the neutral control phase (A) becomes constant. Because of this learning control, learning control is performed taking the times of the first and second sweeps, and the hydraulic pressure values reduced by the first and second sweeps, and the like, as learning amounts.

There are various methods for performing this learning control, such as changing the angle at which the hydraulic pressure is reduced in the first sweep or changing the angle at which the hydraulic pressure is reduced in the second sweep. It should be noted that this invention is not limited to either of these.

The process in step S130 of the flowchart for the routine executed by the transmission control computer 1020, which is the control apparatus according to the exemplary embodiment of the invention, is executed until the turbine rotational speed NT starts to rise. As described above, the G sensor value input from the G sensor has a time delay of about one second because of the smoothing process. Therefore, the transmission control computer 1020 performs learning control on the clutch pressure control duty so that the rise in the turbine rotational speed NT generated partway through the second sweep is always delayed by about one second. Accordingly, when it is again determined whether the G sensor value input from the G sensor is greater than the predetermined threshold value (i.e., step S130) and the resultant determination is that the G sensor value is greater than the predetermined threshold value before the input clutch 310 is completely released, the transmission immediately shifts from the neutral control phase (A) to the control to cancel the neutral control.

As a result, by having the transmission control computer, which is the control apparatus according to the exemplary embodiment of the invention, execute the neutral control routine, the neutral control is started immediately when the G sensor value input from the G sensor is detected when the vehicle is in stationary or the like, and the other conditions for starting the neutral control are fulfilled at that time. After a hydraulic pressure command to release the input clutch is output in order to execute the neutral control, the G sensor value input from the G sensor is again compared with the predetermined threshold value. When that G sensor value is greater than the threshold value, the process to cancel the neutral control is executed. Because the time it takes for the input clutch to completely release after the hydraulic pressure command control has been output is longer than the time delay from the smoothing process in the G sensor, even after the neutral control has started it is possible to cancel it before the transmission shifts into the neutral state when the vehicle is actually stopped on an incline, as well as start it based on the G sensor value input from the G sensor immediately after the vehicle is stopped when the vehicle is actually stopped on a flat road. As a result, the control apparatus for an automatic transmission which performs neutral control is able to extend the time during which the neutral control is executed in order to further improve fuel efficiency.

The automatic transmission described in the exemplary embodiment is a belt type continuously variable transmission. The invention, however, is not limited to this. The automatic transmission may be a troidal type continuously variable transmission or an automatic transmission having a fluid coupling and a planetary gear type reduction mechanism.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus for an automatic transmission, which executes a neutral control by which an input clutch that transmits driving force from a driving source to the automatic transmission is released when conditions, being i) a shift lever is in a position corresponding to a forward speed range, ii) an accelerator operation is not being performed, iii) a brake operation is being performed, and iv) a vehicle speed is equal to, or less than, a predetermined vehicle speed, are fulfilled, the control apparatus comprising:
   a controller which detects a road gradient and outputs a command to release the input clutch when i) the detected road gradient is equal to, or less than, a predetermined value, and ii) the conditions are fulfilled,
   wherein, after the command has been output, the controller compares the detected road gradient and the predetermined value and cancels the output of the command if the road gradient is greater than the predetermined values,
   wherein the controller detects the road gradient using an acceleration sensor, the acceleration sensor outputting a true road gradient after a first period of time which is a delay due to data processing of data indicative of the detected road gradient, and generates the command so that the input clutch will be completely released after a second period of time, which is longer than the first period of time, has passed after the command has been output from the controller.

2. The control apparatus for an automatic transmission according to claim 1, wherein the predetermined value is a value indicating that the vehicle is not on an incline.

3. The control apparatus for an automatic transmission according to claim 1, wherein the controller outputs the command to release the input clutch immediately when the detected road gradient is equal to, or less than, the predetermined value and the conditions are fulfilled.

4. The control apparatus for an automatic transmission according to claim 1, wherein a torque converter is provided between the driving source and the automatic transmission.

5. The control apparatus for an automatic transmission according to claim 1, wherein power from the driving source is transmitted to the automatic transmission via the driving source, a torque converter, and the input clutch.

6. A control method for an automatic transmission, by which is executed a neutral control by which an input clutch that transmits driving force from a driving source to the automatic transmission is released when conditions, being i) a shift lever is in a position corresponding to a forward speed range, ii) an accelerator operation is not being performed, iii) a brake operation is being performed, and iv) a vehicle speed is equal to, or less than, a predetermined vehicle speed, are fulfilled, the control method comprising the steps of:

detecting a road gradient;
  outputting a command to release the input clutch when i) the detected road gradient is equal to, or less than, a predetermined value, and ii) the conditions are fulfilled;
  after the command has been output, comparing the detected road gradient and the predetermined value and canceling the output of the command if the road gradient is greater than the predetermined value;
  outputting a true road gradient after a first period of time; and
  releasing the input clutch after a second period of time, which is longer than the first period of time, has passed after the command to release the input clutch has been output.

7. The control method for an automatic transmission according to claim 6, wherein the predetermined value is a value indicating that the vehicle is not on an incline.

8. The control method for an automatic transmission according to claim 6, further comprising the step of:

outputting the command to release the input clutch immediately when the detected road gradient is equal to, or less than, the predetermined value and the conditions are fulfilled.

9. The control method for an automatic transmission according to claim 6, wherein a torque converter is provided between the driving source and the automatic transmission.

10. The control method for an automatic transmission according to claim 6, wherein power from the driving source is transmitted to the automatic transmission via the driving source, a torque converter, and the input clutch.

* * * * *